Feb. 13, 1951            R. E. APPLING           2,541,907
RECIPROCATING KNIFE TYPE CUTTING
MACHINE WITH DISCHARGE MEANS
Filed Feb. 27, 1948                                  3 Sheets-Sheet 1
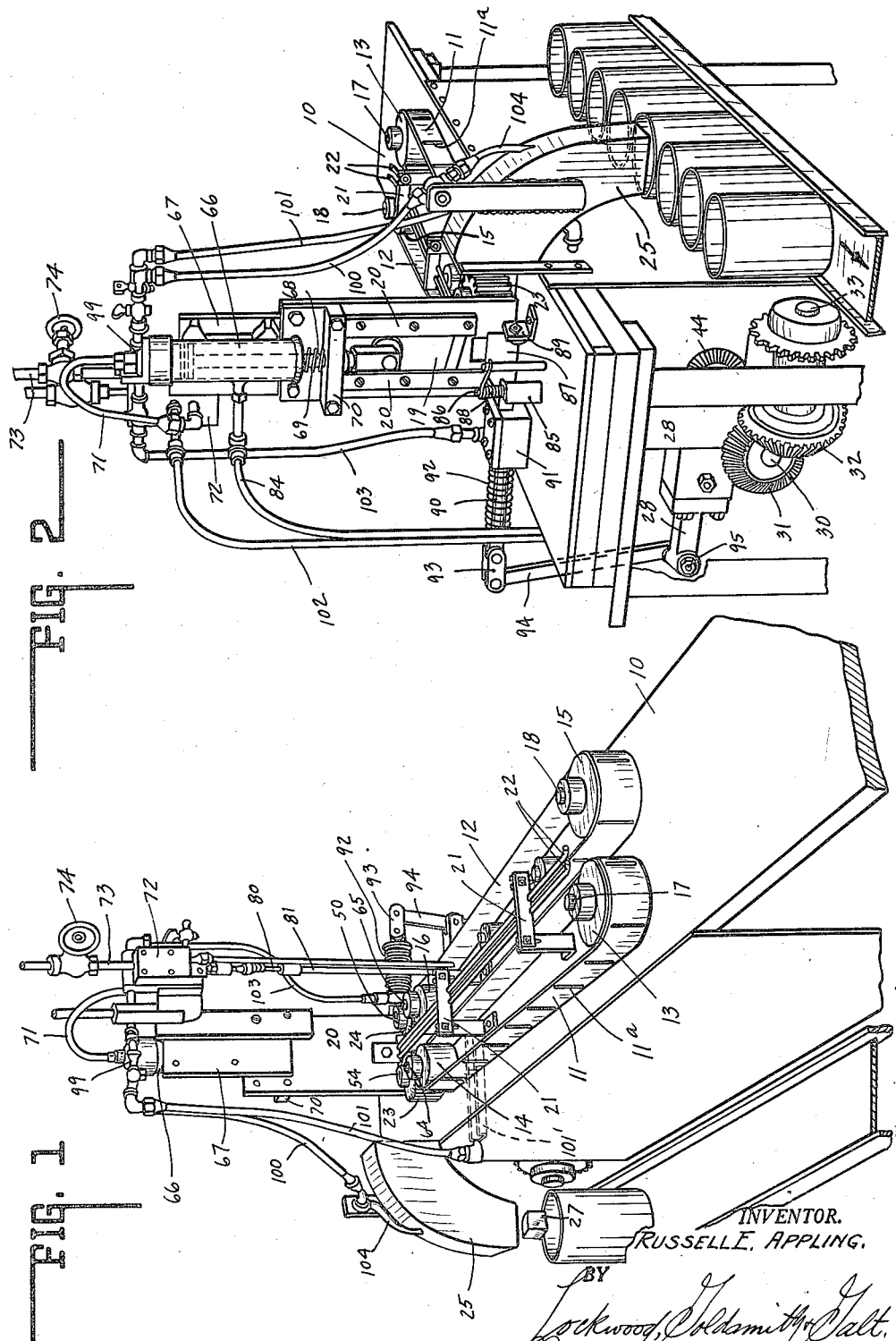
INVENTOR.
RUSSELL E. APPLING.
BY
Lockwood, Goldsmith & Galt.
ATTORNEYS.

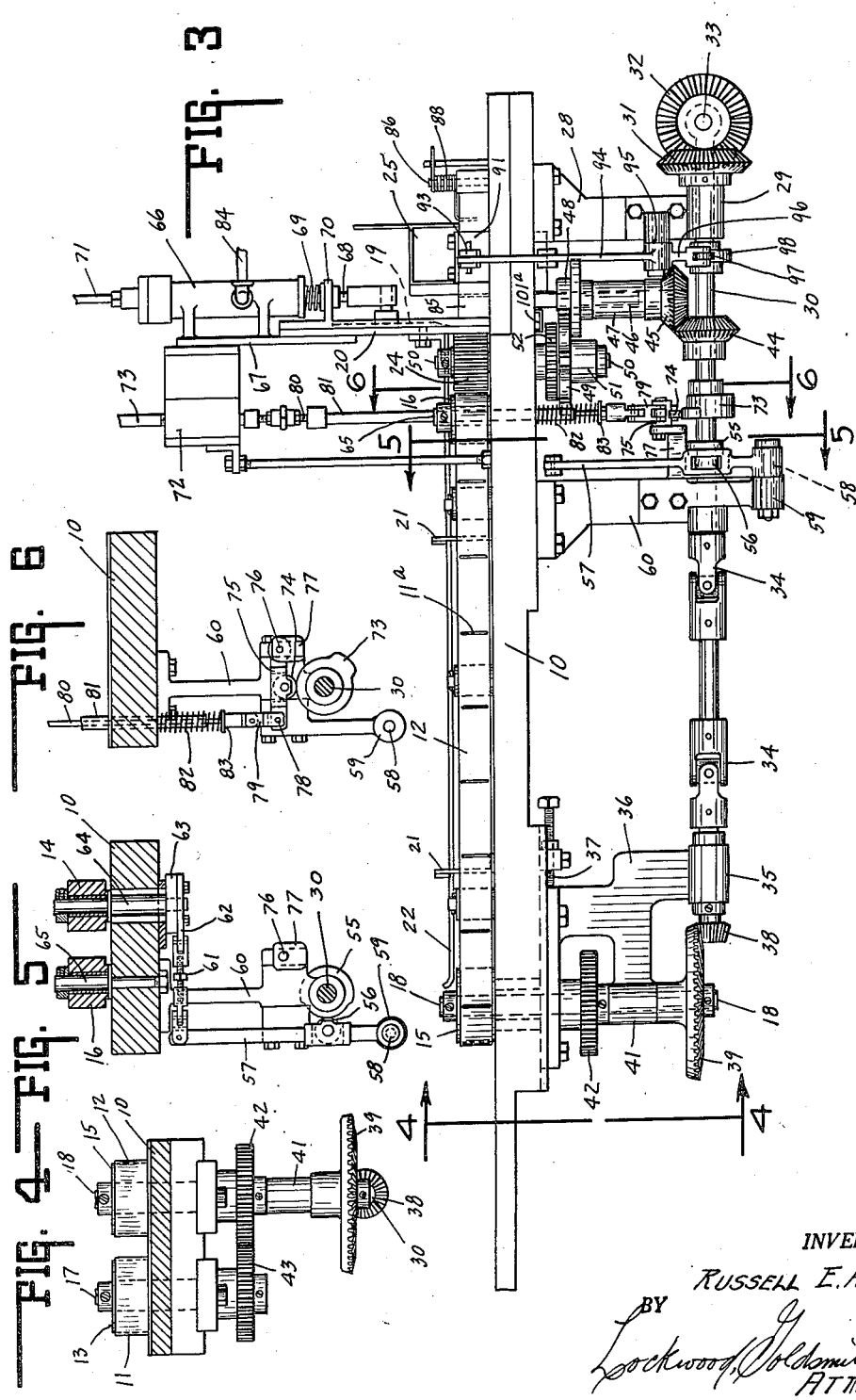

Feb. 13, 1951 R. E. APPLING 2,541,907
RECIPROCATING KNIFE TYPE CUTTING
MACHINE WITH DISCHARGE MEANS
Filed Feb. 27, 1948 3 Sheets-Sheet 3
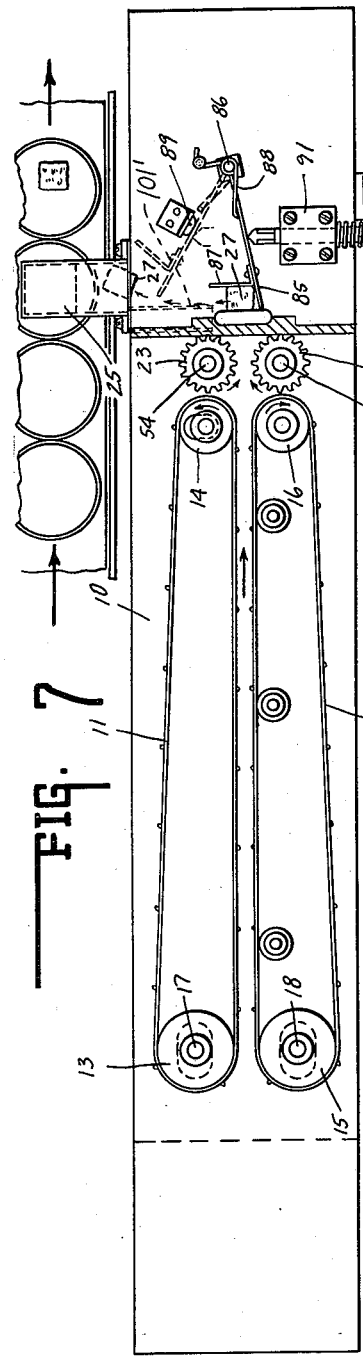
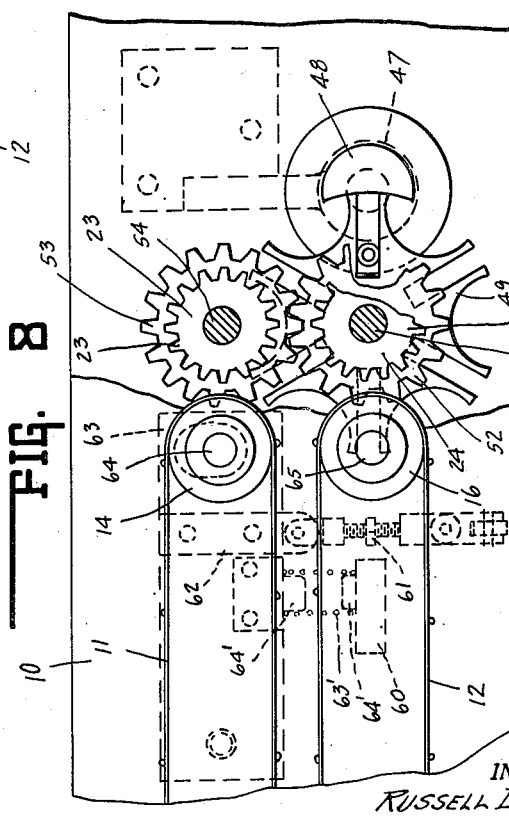
INVENTOR.
RUSSELL E. APPLING.
BY
Lockwood, Goldsmith & Galt,
Attorneys.

Patented Feb. 13, 1951

2,541,907

UNITED STATES PATENT OFFICE 2,541,907

RECIPROCATING KNIFE TYPE CUTTING MACHINE WITH DISCHARGE MEANS

Russell E. Appling, New Bedford, Mass., assignor to Stokely Foods, Inc., Indianapolis, Ind., a corporation Application February 27, 1948, Serial No. 11,500

6 Claims. (Cl. 146—154)

1

This invention relates to a dicing machine adapted to intermittently cut and feed cubed food products to cans in timed relation with the filling and sealing thereof. It is more particularly applicable to cubing pork or similar edible solids to a substantially predetermined size for delivery to individual cans of beans or the like, as in canning pork and beans.

It is the purpose of this invention to provide an automatic machine adapted to feed strips of pork to a dicing or cubing knife in timed relation with its cutting stroke to cut a predetermined length of the strip and discharge each diced or cubed piece into individual cans as they are conveyed to the filling or packing equipment, and in timed relation therewith.

This is accomplished by continuously urging the strip of pork or a similar edible product into position for a predetermined length thereof to be fed intermittently to the dicing knife in timed relation with its cutting operation, and discharging the diced or cubed piece to individual cans as they are caused to pass the machine in timed relation to its feeding and dicing operation, all as hereinafter more particularly set forth and described.

The full nature of the invention will be understood from the accompanying drawings and the following description and claims:

Fig. 1 is a perspective view showing the upper portion of the machine from the feeding end.

Fig. 2 is a perspective view showing the upper portion of the machine from the discharge end.

Fig. 3 is a side elevation of the machine.

Fig. 4 is an end view of the machine taken in the direction of the lines 4—4 of Fig. 3.

Fig. 5 is a section taken on the line 5—5 of Fig. 3.

Fig. 6 is a section taken on the line 6—6 of Fig. 3.

Fig. 7 is a plan view of the machine.

Fig. 8 is an enlarged plan view of the Geneva drive mechanism of the machine with portions broken away.

In the drawings there is shown a dicing machine having a top work plate 10 for receiving a strip of pork or similar edible material to be diced and fed to cans in individual cube-like form. Said plate is adapted to receive a strip of pork or the like which has preferably been precut to the desired cross sectional dimensions. A pair of feeding bands 11 and 12 are mounted to travel on edge over the top plate, the band 11 being driven by the pulley wheel 13 and extending about an idler wheel 14. Similarly the band

2

12 is driven by the pulley wheel 15 extending about the idler wheel 16. The driving pulley wheels 13 and 15 are keyed to the shafts 17 and 18, respectively, which extend vertically downwardly through the plate 10. The inner strands of the bands are spaced apart just sufficiently to receive and grip therebetween the strip of pork for carrying it toward the dicing knife 19 slidably mounted between the guide plates 20.

Spanning the inner strands of the bands there are brackets 21 secured to the top plate at spaced intervals which carry guide rods 22 for retaining the strip of pork or the like in feeding relation to the bands. Said bands constantly urge the strip to a position between the intermittent feeding rollers 23 and 24 which lie adjacent the knife 19. Said rollers are driven through suitable mechanism to rotate through a predetermined angular displacement according to the desired longitudinal dimension of the strip to be cut for feeding it under the knife in timed relation with the dicing operation. Upon the strip having been fed to the desired longitudinal dimension by the feeding rollers, it is temporarily freed by the bands while the dicing operation is in progress. For this purpose the bands are intermittently spread laterally to release the strip. However, to prevent buckling of the strip of material, the bands 11, 12 are preferably made of flexible metal provided with spaced transverse wire flights 11a, such as to permit of slippage upon the material meeting resistance.

Upon the dicing knife 19 operating to cut the predetermined length of the strip, the cut or diced portion thereof is discharged into a distributing spout 25 extending laterally and downwardly from the machine. Said spout is arranged to discharge the diced pork indicated at 27 into a can positioned thereunder during its travel to the filling machine, not shown.

The driving and timing mechanism for the operation of the pulley wheels 13 and 15, the feeding wheels 23, 24, and the spreading of the feeding bands at their discharge end is carried below the plate 10 as illustrated in Fig. 3.

At the driving end of the machine there is provided a bracket 28 suspended from the underside of the plate 10. Said bracket is provided with a bearing 29 for supporting one end of the drive shaft 30. The driving end of the shaft 30 has keyed thereto the beveled gear 31 driven by the beveled gear 32 carried by the driving shaft 33. The shaft 33 is driven from a suitable power source in timed relation with the operation of the can filling machine, not shown.

To compensate for misalignment, the shaft 30 extends through a pair of universal joints 34 to the driven end thereof mounted in the bearing 35 supported by the bracket 36. Said bracket is slidably suspended from the underside of the plate 10 and adjusted longitudinally thereof by the take up screw 37 for the purpose of tightening the bands 11, 12. The driven end of the shaft is provided with a beveled pinion 38 driving the beveled gear 39 carried by the lower end of the shaft 18 extending vertically through the bearing 41 in the bracket 36. Said shaft 18 has keyed thereto above the bearing 41 the driving gear 42 which meshes with a mating driven gear 43. The gear 43 is keyed on the shaft 17. Thereby the pulley wheels are driven in opposite directions to drive their respective bands 11 and 12. The mechanism above described is constantly urging the strip between the feeding rollers 23, 24.

For driving the feeding rollers, there is keyed to the shaft 30 a beveled pinion 44 driving the pinion 45 keyed to a stub shaft 46 carried by the bearing 47. Said shaft has keyed to its upper end a Geneva driving member 48 adapted to drive the star wheel 49 of the Geneva drive carried by the stub shaft 50 mounted in the bearing 51. Said shaft carries gear 52 which meshes with the gear 53 on the stub shaft 54. The feeding roller 24 is keyed to the upper end of the shaft 50 and the roller 23 is keyed to the upper end of the shaft 54. Through the Geneva drive the said rollers 23, 24 are thereby intermittently driven in opposite directions through a predetermined angular displacement in timed relation with the driving source.

As it is desirable to cause the bands 11, 12 to release the strip after being fed into dicing position by the feeding rolls 23, 24, said bands are opened up or spread momentarily in timed relation with the feeding action of the rollers. For this purpose (see Figs. 5 and 8), the shaft 30 carries a cam 55 engaged by the cam follower 56 mounted intermediate the ends of an arm 57. The lower end of said arm is pivoted at 58 to a depending portion 59 of the bracket 60 secured to the underside of the plate 10. The upper end of the arm 57 is pivotally connected to an adjustable linkage 61 connected to a strap 62 on the swinging plate 63 which carries the spindle 64 upon which the idler wheel 14 is mounted, the idler wheel 16 being mounted on the fixed spindle 65. The plate 63 is pivoted at is opposite end to the underside of the top plate 10 with its free end carrying wheel 14 adapted to be oscillated by the action of the cam 55. Its said free end is biased outwardly by the spring 63' carried by the studs 64' extending toward each other from the bracket 60 and the underside of plate 63, respectively. Through the cam action, operating arm, and linkage the idler 14 with its band 11 is intermittently moved to and from effective engagement with the strip in timed relation with the feeding action of the feed rollers 23, 24. Thus after the feeding rollers have moved the strip into dicing position, it is released by the laterally swinging movement of the adjacent end of band 11.

The dicing knife 19 is actuated pneumatically through a plunger operating in the cylinder 66 carried by the bracket 67 above the guide plates 20, the pneumatically operated plunger operating within said cylinder is connected with the knife by rod 68, said plunger and knife being normally restrained upwardly under tension of the spring 69 surrounding the rod between the plunger and the fixed support 70 carried by said plates. The upper end of the cylinder 66 is pneumatically connected through the hose 71 with the valve control box 72 similarly mounted on said plates 20. A source of pneumatic pressure is connected with the valve box 72 through the intake line 73 controlled by the valve 74. The control valve in the box 72 is actuated in timed relation with the shaft 30 through the cam 73 mounted thereon (Fig. 6).

Riding on the cam 73 is a cam follower 74 carried intermediate the ends of the lever 75. One end of said lever is pivotally supported at 76 to a fixed arm 77 extending from the bracket 60. The other end of said lever is pivotally connected at 78 through an adjusting link 79 to the valve control rod 80. Said rod extends through a sleeve 81 mounted vertically in the plate 10 for reciprocation therein and is surrounded by the tension spring 82 interposed between the bottom of the plate 10 and a head 83 on the rod and its link 79, said spring urging the cam follower 74 against the cam 73. As the valve rod 80 is intermittently reciprocated by said cam it opens and closes the valve controlling the flow of air or steam to the valve box 72 to the hose 71 to force the plunger and knife 19 downwardly to perform the dicing action.

Substantially midway of the cylinder 66 there is an exhaust connection therewith for bleeding the cylinder through the hose 84. Through the valve control operating in timed relation with the above described mechanism the dicing knife 19 is thereby forced downwardly to chop off so much of the strip of pork or the like as is fed forwardly by the feeding rollers 23, 24.

For discharging the diced piece 27 into the distributing spout 25 after having been cut from the strip, there is provided a flipper plate 85, Fig. 7. Said plate is pivotally mounted upon the top plate 10 by the pin 86 and is provided with a guide finger 87 near the free end thereof. Said plate is biased in its receiving position (as shown by full lines in Fig. 7) by the torsion spring 88 and is capable of being moved to the dotted line position against the torsion of said spring and against the stop 89. In its receiving position it is adapted to receive the diced piece 27 after being severed by the knife, whereupon it is rapidly moved toward the stop 89 in a manner to flip the piece in the direction of the arrows into the distributing spout 25. For thus moving the flipper plate there is provided a plunger 90 having its free end bearing against said plate and slidably mounted in the guide member 91. Surrounding the plunger there is a spring 92 which biases it to retracted position. Said plunger is linked at its actuating end by the link 93 to the upper end of the long arm 94 of a bell crank lever, said lever being fulcrumed at 95 to the bracket 28. The short arm 96 of said lever carries a cam follower 97 which rides the cam 98 on the shaft 30. Thus, through the action of the cam 98 driven in timed relation by the shaft 30 the bell crank lever, through the plunger 90, imparts a flipping action to the flipper plate 85.

As shown herein, steam may be supplied from the steam line 73 through a header 99 to the hose 100, 101, 102, and 103 for supplying heat to certain parts of the machine for warming the fat content of the pork or the like being operated upon. Where such product includes fats, the operation is improved by supplying enough heat to the affected parts of the machine as to produce a lubricating effect. Otherwise the grease from the fats may accumulate and become hardened to such a degree as to impair the operation.

For this purpose the heating hose 100 discharges steam through a nozzle 104 against the outer surface of the distributing spout to keep it warm. The hose 101 discharges fluid, such as steam under pressure through a suitable channel indicated at 101' (Fig. 8) extending transversely of the plate 10 along the underside thereof to remove any scrap resulting from the dicing of the material. The hose 102 is a bleeder line leading from the valve box. The hose 103 is directed to the back of the flipper plate 85 to keep it warm and thereby prevent adhesion of the diced pieces 27 thereto. It also serves to keep the path of discharge warm to facilitate movement of the diced pieces.

However, wherein it may be desired to operate the knife by air rather than steam, or mechanically, other heating mediums may be applied wherein the product operated upon carries a degree of fats. Such heating means, including the hose 100, 101, and 103, or other heating medium, may be dispensed with when the product is of a character not requiring heat for lubricating purposes.

The invention claimed is:

1. A dicing machine for supplying diced portions of strip material to cans, including a dicing knife, a pair of intermittently driven feed rollers for receiving and introducing a predetermined length of material to said knife for severance, a pair of continuously moving conveyors bands for receiving the strip of material and urging it into engagement with said rollers, a reciprocating discharge member positioned on the opposite side of said knife from said rollers to receive the severed portion of said strip and slide it laterally from said knife for discharge to a can, and driving mechanism operable to continuously drive said conveyor bands and intermittently effect their release of said strip, actuate said knife, rollers, and discharge member in timed relation.

2. A dicing machine for supplying diced portions of strip material including a dicing knife, intermittently actuated means for feeding a predetermined length of said material to said knife for severance, a pair of continuously moving conveyor bands for receiving the strip of material therebetween and urging it into position for engagement by said feeding means, mechanism for spreading said bands to release said material adjacent said feeding means during the operation of said knife, and driving mechanism operable to continuously drive said conveyor bands and intermittently actuate said knife, feeding means, and spreading mechanism in timed relation.

3. A dicing machine for supplying diced portions of strip material including a reciprocating dicing knife, a pair of intermittently actuated feeding members for engaging and introducing a predetermined length of material to said knife for severance, a pair of continuously moving conveyor bands for receiving the strip of material and urging it into position for engagement by said feeding members, releasing mechanism for spreading said bands during the operation of said knife, and driving mechanism operable to continuously drive said conveyor bands and intermittently actuate said knife and feeding means in timed relation.

4. A dicing machine for supplying diced portions of strip material to cans including a reciprocating knife, a pair of intermittently driven feed rollers for receiving and introducing a predetermined length of material to said knife for severance and in timed relation with the operation thereof, a pair of continuously moving conveyor bands for receiving the strip of material and urging it into engagement with said rollers, a spreader for said conveyor bands for moving them relative to each other to release said material upon being fed by said rollers, a flipper discharge member adapted to receive the severed portion of said strip and movable to discharge it from said knife, and driving mechanism operable to continuously drive said conveyor bands and intermittently actuate said knife, spreader rollers, and discharge member in timed relation.

5. A dicing machine for supplying diced portions of strip material to cans including a reciprocating dicing knife, pneumatic means for intermittently actuating said knife, a pair of intermittently driven feed rollers for receiving and introducing a predetermined length of material to said knife for severance, a Geneva drive for said rollers, a pair of continuously moving conveyor bands for receiving the strip of material and urging it into engagement with said rollers, a cam actuated spreader for intermittently separating said bands during the operation of said knife, a cam actuated discharge member intermittently movable to receive the severed portion of said strip and discharge it to a can, and a continuously rotating cam shaft for driving said conveyor bands, Geneva drive, cam actuated spreader and discharge member, and controlling said pneumatic means in timed relation to each other.

6. A dicing machine for supplying diced portions of strip material including a dicing knife, feeding members for receiving and introducing a predetermined length of material to said knife for severance, a conveyor operable to engage and move said strip material into receiving engagement by said feeding members, mechanism operably connected with said conveyor to move it to a position for effecting release of the material conveyed thereby upon being engaged and received therefrom by said feeding members, intermittently operable driving elements for said knife, feeding members and mechanism respectively, and means for continuously driving said conveyor and said intermittently operable driving elements in timed relation.

RUSSELL E. APPLING.

REFERENCES CITED

The following references are of record in the file of this patent:

UNITED STATES PATENTS

| Number | Name | Date |
| --- | --- | --- |
| 582,487 | Rupp | May 11, 1897 |
| 1,317,690 | Fewell | Oct. 7, 1919 |
| 1,420,235 | Bjorlin | June 20, 1922 |
| 1,539,286 | Wahlstrom | May 26, 1925 |
| 1,636,530 | Nyhus | July 19, 1927 |
| 1,824,913 | Milligan | Sept. 29, 1931 |
| 1,878,070 | Van Berkel | Sept. 20, 1932 |
| 2,007,339 | McKee et al. | July 9, 1935 |